UNITED STATES PATENT OFFICE.

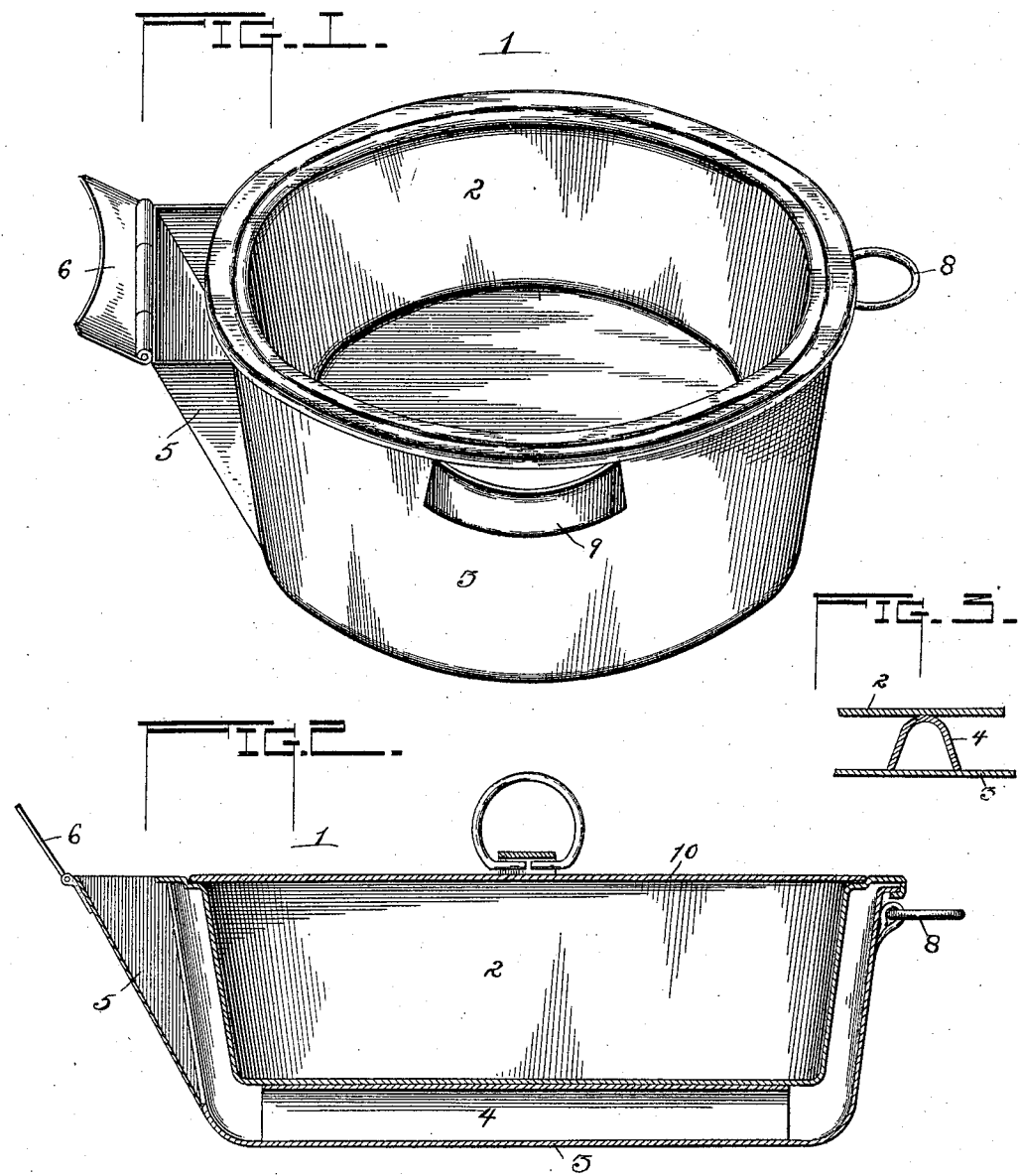

SUSANNA RINER QUINBY, OF OMAHA, NEBRASKA.

BREAD-RAISER.

SPECIFICATION forming part of Letters Patent No. 582,373, dated May 11, 1897.

Application filed February 20, 1896. Serial No. 580,043. (No model.)

*To all whom it may concern:*

Be it known that I, SUSANNA RINER QUINBY, a citizen of the United States, residing at Omaha, in the county of Douglas and State of Nebraska, have invented a new and useful Bread-Raiser, of which the following is a specification.

The invention relates to improvements in bread-raisers.

The object of the present invention is to improve the construction of bread-raisers and to provide a simple, inexpensive, and efficient one which will be capable of uniformly heating dough to be raised and which after being used may be thoroughly drained to prevent its interior from rusting.

A further object of the invention is to provide a bread-raiser which will have a convenient receptacle in which the dough may be prepared or kneaded.

The invention consists in the construction and novel combination and arrangement of parts hereinafter fully described, illustrated in the accompanying drawings, and pointed out in the claim hereto appended.

In the drawings, Figure 1 is a perspective view of a bread-raiser constructed in accordance with this invention, the cover being removed. Fig. 2 is a vertical sectional view, the cover being in place. Fig. 3 is a detail view illustrating the construction of the support for the bottom of the inner pan or casing.

Like numerals of reference designate corresponding parts in all the figures of the drawings.

1 designates a vessel composed of inner and outer imperforate pans or casings 2 and 3, forming an intervening space at the sides and bottom, adapted for the reception of water, which will cause the receptacle to be heated uniformly. The inner and outer pans or casings are firmly and rigidly united at their upper edges, and a support 4 is interposed between the bottom of the pans or casings. The support 4 extends across the receptacle and is interposed between the bottoms of the inner and outer casings and is substantially inverted-V-shaped in cross-section, the lower edges of the sides being arranged on the upper face of the bottom of the outer pan or casing and the apex or bend supporting the bottom of the inner pan or casing.

The water employed in raising dough is introduced into the intervening space between the inner and outer pans or casings through a spout 5, arranged at one side of the receptacle adjacent to an aperture of the outer pan or casing, and a lid 6 is hinged to the outer side of the spout at the upper edge thereof and is adapted to close the mouth of the spout. This spout is also employed for draining the receptacle, and to facilitate this operation a loop or ring 8 is hinged to the receptacle at a point diametrically opposite the spout to enable the receptacle to be hung on a nail or other suitable support. The lid 6 by being hinged to the outer side of the spout will be held open by gravity when the bread-raiser is suspended for draining, and the support 4, which is substantially U-shaped in cross-section, is disposed diametrically of the receptacle in a line with the loop and the spout, in order not to interfere with the draining of the device. When the receptacle is suspended with the spout at the bottom, the water will completely drain from the intervening space and the interior of the receptacle will become thoroughly dried, thereby preventing rusting and increasing the durability of the device. Rigid handles 9 are secured to the receptacle at opposite sides thereof to enable it to be readily carried.

The dough is mixed, prepared, or kneaded in the inner pan or casing, which forms a convenient receptacle for the same, after which it is removed preparatory to raising, as hereinafter described. The dough to be raised is placed in suitable pans or tins, and is supported on a flat cover or plate 10, and is designed to be covered by a suitable cloth for retaining the heat, and the cover, which is provided with a central hinged loop or handle, is firmly supported on the upper edge or face of the receptacle. After water has been introduced into the space between the inner and outer pans or casings any heat which may be applied to any particular point is equally distributed by the water and the dough is uniformly heated.

It will be seen that the bread-raiser is exceedingly simple and inexpensive in construction, that it is capable of producing conditions most favorable for dough-raising, and that it may be readily supplied with water and is capable of being thoroughly drained after use. It will also be apparent that the inner pan or casing provides a convenient receptacle for mixing and kneading dough.

Changes in the form, proportion, and minor details of construction may be resorted to without departing from the spirit or sacrificing any of the advantages of this invention.

What I claim is—

A bread-raiser comprising a receptacle composed of inner and outer imperforate pans connected at their upper edges and forming an intervening water-receiving space, a spout arranged at one side of the receptacle over the aperture of the outer pan, and having its upper edges of the same plan as the upper edges of the receptacle, a lid hinged to the outer edge of the spout and adapted to open automatically by gravity when the receptacle is hung up for draining, a ring or loop arranged at the top of the receptacle at a point diametrically opposite the spout, whereby, when the receptacle is hung up the spout will be at the bottom and will remain open in order that the bread-raiser may thoroughly drain, and the support 4, substantially U-shaped in cross-section, interposed between the bottoms of the pans and extending diametrically across the same in line with the spout and the ring, so as not to interfere with the draining of the bread-raiser, substantially as described.

In testimony that I claim the foregoing as my own I have hereto affixed my signature in the presence of two witnesses.

SUSANNA RINER QUINBY.

Witnesses:
 STILLMAN J. QUINBY,
 E. E. ZIMMERMAN.